United States Patent [19]

Nakajima

[11] 4,153,220

[45] May 8, 1979

[54] FISHING REEL

[75] Inventor: Kazunari Nakajima, Osaka, Japan

[73] Assignee: Nakajima Co., Ltd., Osaka, Japan

[21] Appl. No.: 862,885

[22] Filed: Dec. 21, 1977

[30] Foreign Application Priority Data

Dec. 24, 1976 [JP] Japan .......................... 51-174799[U]
Dec. 24, 1976 [JP] Japan .......................... 51-174800[U]

[51] Int. Cl.$^2$ .......................................... A01K 89/02
[52] U.S. Cl. ........................... 242/84.51 R; 242/129.7
[58] Field of Search ........ 242/84.1 R, 84.53, 84.51 R, 242/84.5 R, 219, 68.3, 129.5, 130, 129.7, 129.71, 129.72, 130.2, 130.3, 84.1

[56] References Cited

U.S. PATENT DOCUMENTS

| | | | |
|---|---|---|---|
| 2,544,962 | 3/1951 | Legg | 242/84.53 |
| 2,984,432 | 5/1961 | Clark | 242/84.53 X |
| 2,984,433 | 5/1961 | Clark | 242/84.5 R X |
| 3,039,716 | 6/1962 | Visockis | 242/129.7 X |
| 3,241,788 | 3/1966 | Visockis | 242/84.51 R |
| 3,359,020 | 12/1967 | O'Donnell | 242/68.3 X |
| 3,827,649 | 8/1974 | Payen | 242/84.1 R |

FOREIGN PATENT DOCUMENTS

1090952 10/1954 France ................................. 242/129.7
17501 of 1891 United Kingdom ............... 242/84.5 R Primary Examiner—Billy S. Taylor
Attorney, Agent, or Firm—Sughrue, Rothwell, Mion, Zinn and Macpeak

[57] ABSTRACT

A fishing reel comprising a reel body and a line spool both made of molded plastic is disclosed. The reel body includes a line spool connecting mechanism and an anti-reversal mechanism for the line spool. The line spool connecting mechanism is so designed that the line spool is detachably and rotatably connected to a spool shaft which extends from a concavity of a reel body. The anti-reversal mechanism is so designed that the rotary motion of the line spool can be readily controlled as desired.

3 Claims, 6 Drawing Figures

FISHING REEL

SUMMARY OF THE INVENTION

This invention relates to a fishing reel comprising a reel body and a line spool, and more particularly to a fishing reel wherein the reel body is provided with novel line spool connecting and an anti-reversal mechanisms.

It is a primary object of the present invention to provide a novel fishing reel having a line spool connecting mechanism and an anti-reversal mechanism for a line spool, which is especially simple in construction and is easy and inexpensive to produce.

Another object of the present invention is to provide a novel fishing reel having a line spool connecting mechanism permitting easy detachment and connection of a line spool to the reel body.

A further object of the present invention is to provide a novel fishing reel having an anti-reversal mechanism for a line spool capable of controlling the rotary motion of a line spool by simple operation.

A still further object of the present invention is to provide a novel fishing reel which is durable for prolonged periods.

These objects of the present invention are attained by a novel line spool connecting mechanism and a novel anti-reversal mechanism.

DETAILED DESCRIPTION OF THE PREFERRED EMBODIMENT

Referring now to the accompanying drawings, and initially to FIGS. 1 to 4, there is shown an embodiment of a fishing reel according to the present invention which includes a line spool connecting mechanism for detachably connecting a line spool to a reel body and an anti-reversal mechanism for controlling line spool motion. More specifically, a fishing reel according to the present invention comprises a reel body 1 and a line spool 9 which is rotated by a handle 11 provided at its outer surface. The reel body 1 has a concavity 2 adapted to receive the line spool 9 therein.

Figure 1:
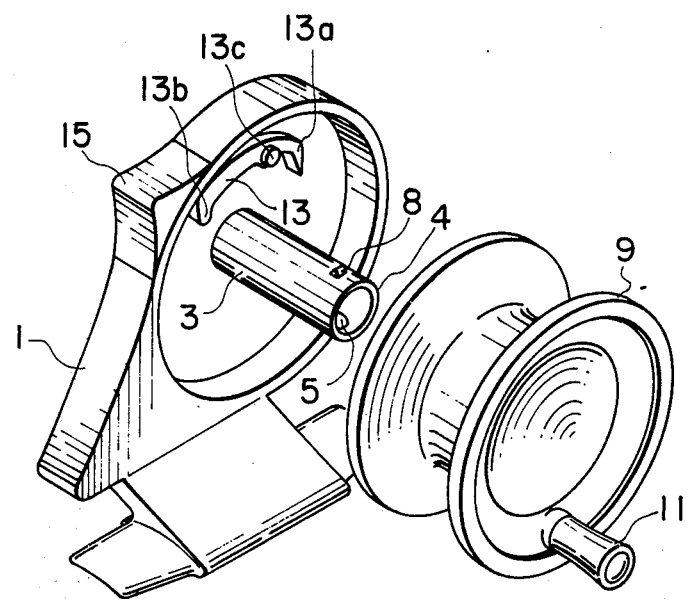
FIG. 1 is a perspective view illustrating a preferred embodiment of a fishing reel according to the present invention.
Figure 3:
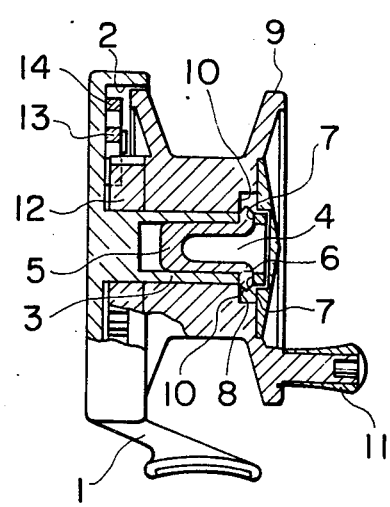
FIG. 3 is a cross-sectional view illustrating a preferred embodiment of a fishing reel according to the present invention.

In FIGS. 1 and 3 which best show the line spool connecting mechanism, a spool shaft 3 extends outwardly from the center of the concavity 2 and is adapted to receive an elastic member 5 in its hollow portion 4. In addition, the hollow spool shaft 3 is provided at diametrically opposite portions of its side wall in proximity to its end with through-holes 7. The elastic member 5 is U-shaped and is inserted base end first into the hollow portion 4. Furthermore, two end portions 6 of the U-shaped elastic member 5 are formed so that they project outwardly and perpendicularly to the longitudinal axis thereof, and these end portions 6 extend through respective holes 7 in hollow spool shaft 3. Accordingly, the U-shaped elastic member 5 is held in the hollow portion 4 in caliper-like manner. The two end portions 6 of the U-shaped elastic member 5 are provided with tapered or rounded camming surfaces 8. The aforementioned line spool 9 has a hollow portion to receive the spool shaft 3, and this hollow portion is provided at its inside wall in close vicinity to the bottom with a engaging groove 10 so that the camming surfaces 8 engage with the side wall of the groove 10. Accordingly, assuming that the line spool 9 is rotatably connected to the reel body 1 as shown in FIG. 3, the camming surfaces 8 serve as a stopper for preventing the line spool 9 from being undesirably released from the reel body 1, yet a gentle force permits easy removal of the line spool when desired.

In order to connect the line spool 9 to the reel body 1, the line spool 9 is fitted with the spool shaft 3 of the reel body 1 in advance in such a condition that the ratchet wheel 12 faces to the concavity 2. Subsequently, the line spool 9 is pushed toward the reel body 1, whereby the camming surfaces 8 of the U-shaped elastic member 5 are squeezed together against the elastic force of the elastic member 5 by the engagement of the camming surfaces 8 and the inside wall of the hollow portion 4 of the line spool 9. The line spool 9 is further pushed toward the concavity 2 until the camming surfaces 8 engage with the groove 10, as a result of which the camming surfaces 8 serve as a stopper and prevent the line spool 9 from releasing from the reel body 1. To detach the line spool 9 from the reel body 1, the line spool 9 is simply pulled from the reel body 1.

Figure 2:
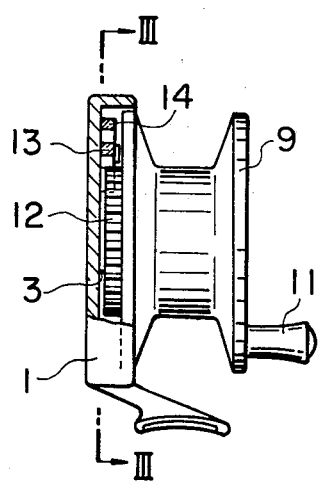
FIG. 2 is a side view with a portion of the reel body cut away to illustrate a preferred embodiment of a fishing reel according to the present invention.
Figure 4:
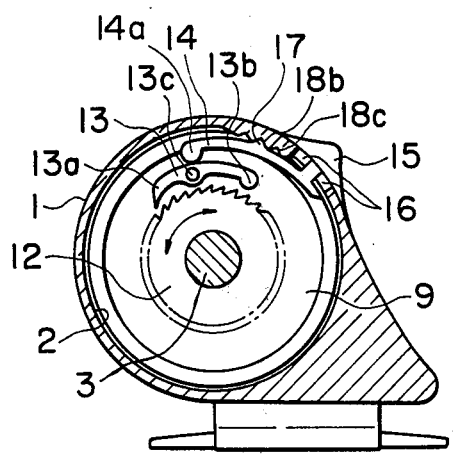
FIGS. 4, 5 and 6 are cross-sectional views taken along the line III—III of FIG. 2 which show the relation between a pivotal ratchet pawl and a ratchet wheel, wherein the pivotal pawl is positioned in "free" position in FIG. 4, the pivotal ratchet pawl is positioned in "stop" position in FIG. 5, and the pivotal ratchet pawl is positioned in "brake" position in FIG. 6.

In FIGS. 2 and 4 which mainly show an anti-reversal mechanism for a line spool, the anti-reversal mechanism comprises a ratchet wheel 12 integrally formed or fixedly secured to the inner surface of the line spool 9 facing the concavity 2. A ratchet pawl member 13 is pivotably mounted on the bottom portion of the concavity 2 so as to pivot about a pin 13c and is engagable with the ratchet wheel teeth. The pivotal ratchet pawl member 13 has a pawl portion 13a at one end capable of optionally engaging with the ratchet wheel teeth and a rounded engaging portion 13b at the other end capable of optionally contacting with the ratchet wheel teeth. An operating member 14 contacts the outside of the ratchet pawl member 13 in the concavity 2 and is shifted by a thumb lever 15 to any of three desired positions. The thumb lever 15 extends through an opening 16 provided at the periphery of the reel body 1 and is either integrally formed with or fixedly secured to the operating member 14. The operating member 14 has a rounded end portion 14a which always contacts the ratchet pawl so as to slide along the ratchet pawl to position the ratchet pawl member 13. The operating member 14 is retained in any one of the three positions by an engagement between a protrusion 17 provided at the surface of the operating member 14 facing to the periphery of the concavity 2 and three mating grooves 18a, 18b and 18c provided at the periphery of the concavity 2.

In FIG. 4, the thumb lever 15 of the operating member 14 is positioned at the "free" position so that the protrusion 17 of the operating member 14 is engaged with the mating groove 18b provided at the periphery of the concavity 2. As a result, the ratchet pawl member 13 is positioned at a neutral position. This prevents any engagement between the ratchet pawl member 13 and the ratchet wheel teeth whereby the ratchet wheel is allowed to rotate freely. Accordingly, the line spool 9 can be rotated freely in both clockwise and counter-clockwise directions as indicated by an arrow in FIG. 4. Under this condition, it is readily possible to release a fishing line wound about the line spool 9.

Figure 5:
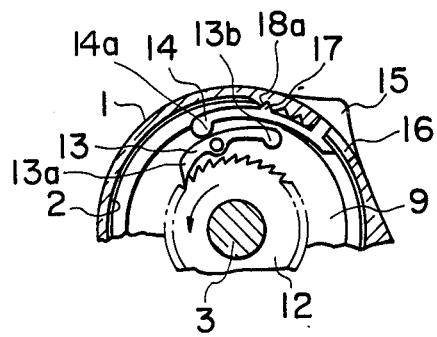

In FIG. 5, the thumb lever 15 is shifted from the "free" position shown in FIG. 4 to the "stop" position so that the protrusion 17 is engaged with the mating groove 18a provided at the periphery of the concavity 2. As a result, the pawl portion 13a of the ratchet pawl member 13 latches a ratchet wheel tooth. This prevents the ratchet wheel 12 from rotating in the clockwise direction. Therefore, the line spool 9 can be rotated in the counter-clockwise direction only as indicated by an arrow in FIG. 5. In this case, the counter-clockwise direction means the rewind direction to retrieve the fishing line. Under this condition, it is only possible to retrieve the fishing line which has already been payed out.

Figure 6:
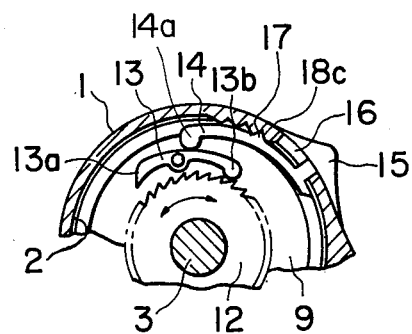

In FIG. 6, the thumb lever 15 is shifted from the "stop" position shown in FIG. 5 to the "brake" position so that the protrusion 17 is engaged with the mating groove 18c provided at the periphery of the concavity 2. As a result, the rounded engaging portion 13b of the ratchet pawl member 13 slidably engages with the ratchet wheel teeth. In this case, while the line spool 9 is allowed to be rotated in both directions as indicated by an arrow in FIG. 6, the force to rotate the line spool 9 is increased due to the frictional engagement of the rounded engaging portion 13b and the ratchet wheel teeth. In fighting with a catch, it is preferable to retrieve and release the fishing line under this condition.

The fishing reel according to the invention may be made entirely of plastic. This has the advantages of making the fishing reel inexpensive to produce and not subject to corrosion and, therefore, both durable and reliable. More specifically, the U-shaped elastic member 5 may be formed by a molding technique. Further, the ratchet wheel 12 may be integrally molded with the line spool 9 as a single component.

As is apparent from the above description, according to the present invention, it is possible to provide a fishing reel having a novel spool connecting mechanism permitting easy connection and detachment of a line spool from a fishing reel body and a novel anti-reversal mechanism capable of controlling the motion of a line spool by the simple operation of shifting a thumb lever.

What is claimed is:

1. A fishing reel comprising a reel body and a line spool, said reel body being formed with a concavity for receiving said line spool and a hollow spool shaft extending outwardly from the center of said concavity, said spool shaft being provided at diametrically opposite portions of its side wall in proximity to its end with through holes, an elastic U-shaped member inserted base end first in said hollow spool shaft and provided with outwardly projecting camming surfaces which extend through said through holes, and said line spool being formed with a hollow portion to receive said spool shaft, the internal side wall of said hollow portion being provided with a groove for receiving said camming surfaces;

said line spool being provided with a ratchet wheel on one face thereof and said reel body is provided with a ratchet pawl member pivotally mounted within said concavity and adapted to cooperate with said ratchet wheel to control the rotary motion of said line spool on said spool shaft, said ratchet pawl member being formed with a pawl portion at one end and a rounded portion at the other end and rotating about a central pivot to engage one or the other or neither of the ends of said ratchet pawl member with said ratchet wheel; and said body being further provided with an operating member and a thumb lever, said operating member extending through a hole in the outer periphery of said reel body and connected to said thumb lever and slidable thereby, said operating member having a rounded end in sliding contact with said ratchet pawl member and a protrusion in mating engagement with any of three grooves formed in the periphery of said concavity, said protrusion being moved between said three grooves by movement of said thumb lever so that said rounded end of said operating member is positioned at either side of or opposite said central pivot.

2. A fishing reel as defined in claim 1, wherein said operating member is movable between first, second and third positions, each of said positions defined by engagement of said protrusion with one of said three grooves, said rounded end exerting pressure on said pawl member in the direction of said ratchet wheel in each of said first, second and third positions.

3. A fishing reel as defined in claim 2, wherein:
said rounded end of said operating member in said first position contacts the pawl member between said pawl portion and said central pivot whereby said pawl portion engages said ratchet wheel to thereby permit rotation of said spool in only one direction;

said rounded end of said operating member in said third position contacts said pawl member between the central pivot and the rounded portion, whereby the rounded portion is urged against said ratchet wheel in order to exert a braking force on said spool during rotation of the latter in either direction; and said rounded end of said operating member in said second position contacting said pawl member in the vicinity of said central pivot whereby neither end of the pawl member is depressed towards said ratchet wheel.

* * * * *